(12) United States Patent
Pu et al.

(10) Patent No.: US 12,182,175 B2
(45) Date of Patent: Dec. 31, 2024

(54) UPDATE-CORRELATIONS BASED OVERWRITE MECHANISM

(71) Applicant: Dell Products L.P., Round Rock, TX (US)

(72) Inventors: Weilan Pu, Sichuan (CN); Jie Wang, Chengdu (CN); Jian Kang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 18/181,738

(22) Filed: Mar. 10, 2023

(65) Prior Publication Data

US 2024/0211493 A1    Jun. 27, 2024

(30) Foreign Application Priority Data

Dec. 21, 2022    (CN) .......................... 202211660116.9

(51) Int. Cl.
*G06F 16/28* (2019.01)
*G06F 16/22* (2019.01)

(52) U.S. Cl.
CPC ........ *G06F 16/285* (2019.01); *G06F 16/2246* (2019.01)

(58) Field of Classification Search
CPC .......................... G06F 16/285; G06F 16/2246
See application file for complete search history.

(56) References Cited

U.S. PATENT DOCUMENTS

| | | | |
|---|---|---|---|
| 11,144,403 B2 * | 10/2021 | Doddaiah | G06F 3/0605 |
| 2006/0018505 A1 | 1/2006 | Cherian et al. | |
| 2008/0229048 A1 * | 9/2008 | Murase | G06F 3/067 |
| | | | 711/171 |
| 2012/0317338 A1 * | 12/2012 | Yi | G06F 3/061 |
| | | | 711/E12.001 |
| 2013/0311707 A1 * | 11/2013 | Kawamura | G06F 12/0246 |
| | | | 711/E12.008 |
| 2014/0201441 A1 | 7/2014 | Rozmovits et al. | |
| 2017/0235492 A1 * | 8/2017 | Liu | G06F 11/3006 |
| | | | 711/165 |
| 2018/0074750 A1 * | 3/2018 | Dudas | G06F 3/0688 |
| 2018/0321874 A1 * | 11/2018 | Li | G06F 11/1004 |
| 2020/0341943 A1 * | 10/2020 | Sarkar | G06F 16/156 |
| 2022/0179830 A1 | 6/2022 | Pu et al. | |
| 2022/0292022 A1 | 9/2022 | Chen et al. | |
| 2023/0063305 A1 * | 3/2023 | Ren | G06F 16/2246 |

* cited by examiner

*Primary Examiner* — James E Richardson
(74) *Attorney, Agent, or Firm* — Larson Newman, LLP

(57) ABSTRACT

An information handling system acquires data chunks for a duration of at least one time slice, determines an overwrite frequency for the duration of the time slice of each of the data chunks, clusters the data chunks according to the overwrite frequency, and determines an overwrite frequency label for each cluster of the data chunks. The system may also determine a read frequency for the duration of the time slice of each of the data chunks, cluster the data chunks based on the read frequency, and determine a read frequency label for each of the cluster of the data chunks. The system may also construct a sorted tree based on the overwrite frequency label, the read frequency label, and a virtual logical block address of each of the data chunks.

20 Claims, 11 Drawing Sheets

| Virtual Block (VB) | TS_0 | TS_1 | TS_2 | TS_3 | TS_4 | TS_5 | TS_6 | TS_7 | TS_8 | TS_9 | TS_10 | TS_* | TS_99 |
|---|---|---|---|---|---|---|---|---|---|---|---|---|---|
| VB_1 | 1 | 1 | 0 | 3 | 1 | 3 | 2 | 4 | 3 | 1 | 2 | ... | 5 |
| VB_2 | 6 | 3 | 5 | 3 | 1 | 2 | 4 | 3 | 1 | 3 | 1 | ... | 0 |
| VB_3 | 0 | 0 | 2 | 3 | 4 | 3 | 1 | 4 | 3 | 0 | 1 | ... | 4 |
| VB_4 | 1 | 1 | 1 | 1 | 2 | 3 | 2 | 4 | 4 | 5 | 0 | ... | 3 |
| VB_5 | 1 | 2 | 2 | 0 | 1 | 4 | 0 | 4 | 3 | 0 | 3 | ... | 0 |
| VB_* | ... | ... | ... | ... | ... | ... | ... | ... | ... | ... | ... | ... | ... |
| VB_59 | 1 | 2 | 2 | 1 | 1 | 1 | 4 | 1 | 1 | 3 | 1 | ... | 5 |

*FIG. 6*

| Virtual Block (VB) | TS_0 | TS_1 | TS_2 | TS_3 | TS_4 | TS_5 | TS_6 | TS_7 | TS_8 | TS_9 | TS_10 | TS_* | TS_99 |
|---|---|---|---|---|---|---|---|---|---|---|---|---|---|
| VB_1 | 7 | 11 | 9 | 11 | 2 | 2 | 15 | 1 | 11 | 22 | 6 | ... | 16 |
| VB_2 | 18 | 18 | 13 | 4 | 5 | 11 | 1 | 9 | 23 | 0 | 12 | ... | 1 |
| VB_3 | 23 | 1 | 5 | 18 | 2 | 20 | 1 | 4 | 18 | 5 | 10 | ... | 10 |
| VB_4 | 8 | 22 | 10 | 17 | 10 | 4 | 4 | 1 | 9 | 16 | 13 | ... | 12 |
| VB_5 | 11 | 4 | 18 | 9 | 4 | 14 | 9 | 12 | 4 | 7 | 1 | ... | 8 |
| VB_* | ... | ... | ... | ... | ... | ... | ... | ... | ... | ... | ... | ... | ... |
| VB_59 | 0 | 23 | 19 | 8 | 4 | 3 | 0 | 1 | 16 | 18 | 2 | ... | 18 |

*FIG. 7*

| Virtual Block (VB) | Overwrite Label | Read Label | Virtual LBA |
|---|---|---|---|
| VB_1 | 1 | 3 | 1 |
| VB_2 | 2 | 0 | 2 |
| VB_3 | 1 | 1 | 3 |
| VB_4 | 1 | 3 | 4 |
| VB_5 | 0 | 2 | 5 |
| VB_6 | 1 | 1 | 6 |
| VB_7 | 0 | 2 | 7 |
| VB_8 | 1 | 3 | 8 |
| VB_9 | 2 | 3 | 9 |
| VB_10 | 1 | 2 | 10 |
| VB_11 | 2 | 0 | 11 |
| VB_12 | 1 | 1 | 12 |

UPDATE-CORRELATIONS BASED OVERWRITE MECHANISM

FIELD OF THE DISCLOSURE

The present disclosure generally relates to information handling systems, and more particularly relates to correlations-based update mechanisms.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system acquires data chunks for a duration of at least one time slice, determines an overwrite frequency for the duration of the time slice of each of the data chunks, clusters the data chunks according to the overwrite frequency, and determines an overwrite frequency label for each cluster of the data chunks. The system may also determine a read frequency for the duration of the time slice of each of the data chunks, cluster the data chunks based on the read frequency, and determine a read frequency label for each of the cluster of the data chunks. The system may also construct a sorted tree based on the overwrite frequency label, the read frequency label, and a virtual logical block address of each of the data chunks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is an overwrite frequency pattern matrix for a correlation-based update mechanism, according to an embodiment of the present disclosure;

FIG. 7 is a read frequency pattern matrix for a correlation-based update mechanism, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
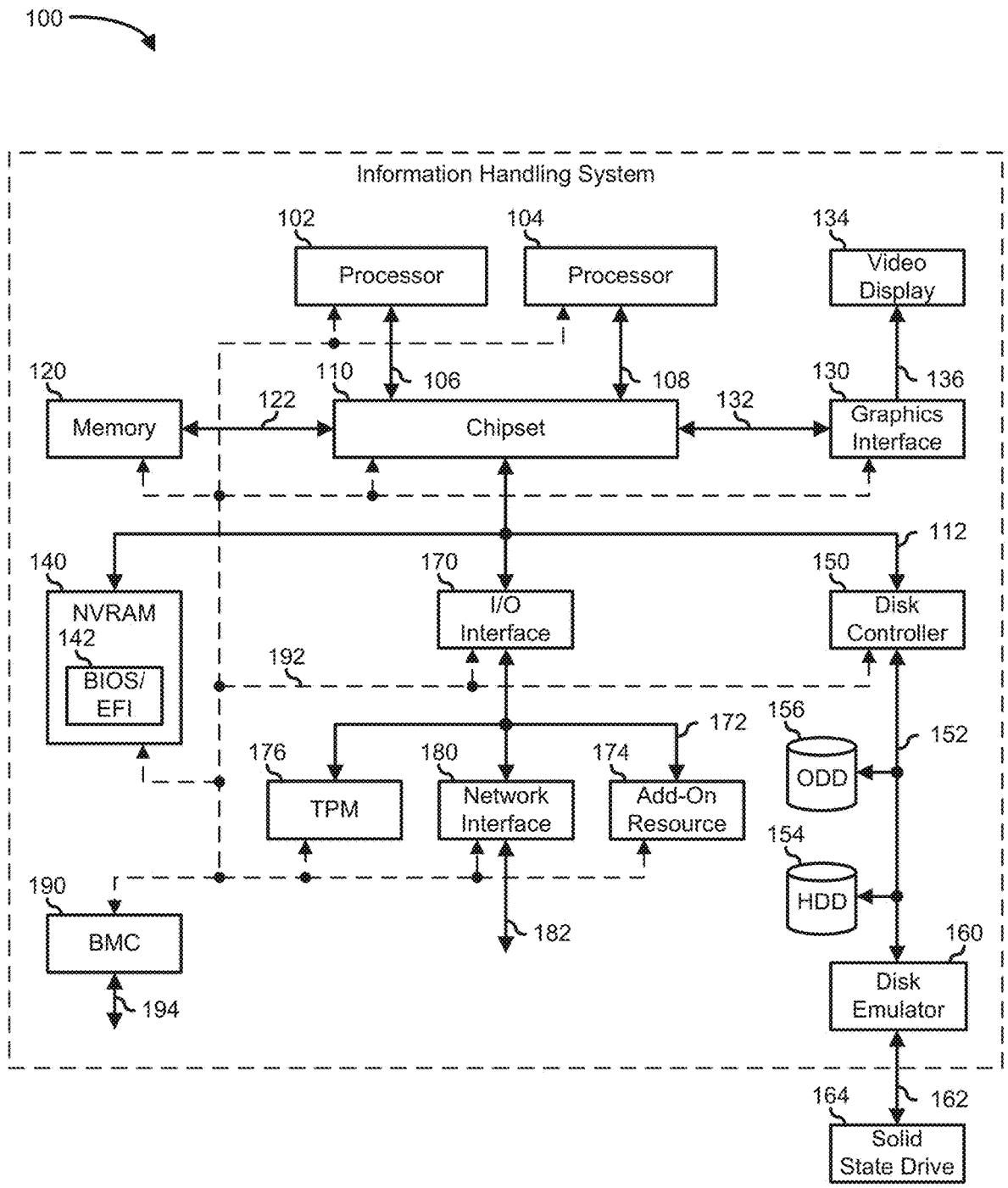
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell R Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Attempting to minimize backup windows, system administrators often prefer to back up data incrementally by backing up only new or modified files to a data storage device, such as HDD 164 of FIG. 1. Current backup technology, such as "copy-on-write" snapshot backup utilities, is a preferred choice for data protection due to its speed, efficiency, and ease of restoring a base or source volume to substantially any point-in-time. The copy-on-write technique is designed to avoid in-place changes by writing out data in newly allocated places. Thus, the copy-on-write technique relies on the number of free physical data blocks available for writing new data. One problem with "copy-on-write" snapshot solutions is that as the system ages, the fragmentation and performance issues become progressively more severe, requiring garbage collection for defragmentation. To address this and other concerns, an update correlations-based data overwrite mechanism for a copy-on-write-based system is provided in the present disclosure.

Figure 2:
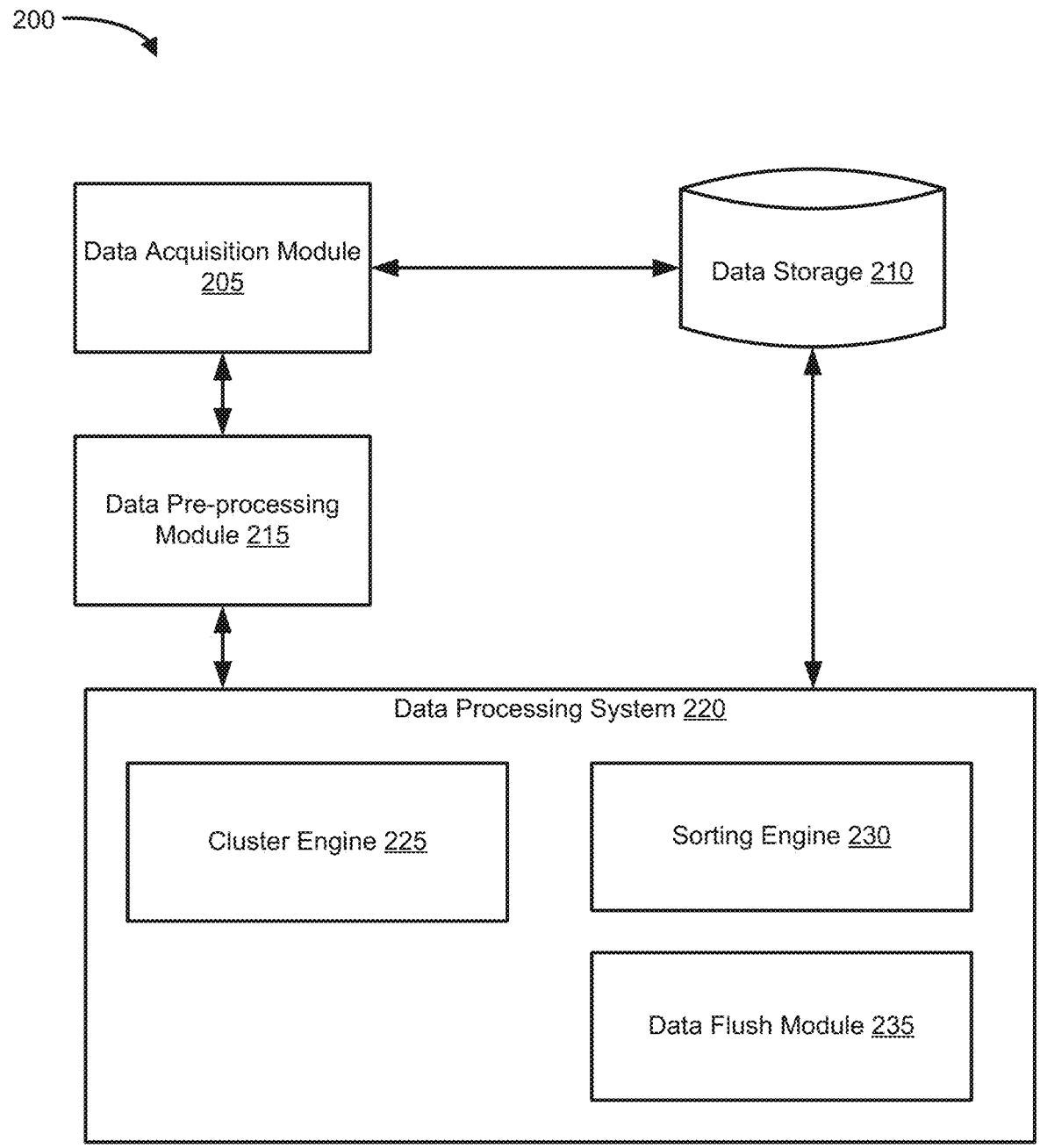
FIG. 2 is a block diagram illustrating a system for a correlation-based update mechanism, according to an embodiment of the present disclosure.

FIG. 2 shows a system 200 for a correlation-based update mechanism. System 200 includes a data acquisition module 205, a data storage 210, a data pre-processing module 215, and a data processing system 220. Data processing system 220 includes a cluster engine 225, a sorting engine 230, and a data flush module. System 200 may be configured to determine update correlations between data chunks, also referred to as data blocks. Such that if two data chunks are overwritten or read at the same time, they may be correlative. The system and method disclosed herein take the following features into consideration: overwrite frequency, read frequency, and virtual logical block address of data chunks. To combine these features, data clustering and generating a sorted tree are used to populate with data chunks and correlate the data chunks into groups.

Data acquisition module 205 may be configured to obtain data, such as data chunks also referred to as data blocks, from one or more sources like data storage 210. In various embodiments, the data can be a time series of data, sales data, weather data, inventory data, traffic data, process data, market data, exchange rate data, etc. In another embodiment, a user may upload data to data acquisition module 205 via a webpage or point data acquisition module 205 to a data location such as a database or file system.

Data pre-processing module 215 may be configured to prepare the data for processing by data processing system 220. In one embodiment, data pre-processing module 215 be configured to determine the overwrite frequency of the acquired data for a series of time slices. For example, data pre-processing module 215 may determine the number of times each data chunk of the acquired data is overwritten for the duration of the time slice. Data pre-processing module 215 may also be configured to determine the read frequency of the acquired data for the series of time slices. For example, data pre-processing module 215 may determine the number of times each data chunk of the acquired data is read for the duration of the time slice. Determining the overwrite frequency and read frequency may be performed in parallel. Data pre-processing module 215 may generate a matrix based on the overwrite frequency of each data chunk similar to overwrite frequency matrix 600 of FIG. 6. Data pre-processing module 215 may also generate a matrix based on the read frequency of each data chunk similar to read frequency matrix 700 of FIG. 7.

Data storage 210 may be a persistent data storage device, such as a solid-state disk, a hard disk drive, a magnetic tape library, an optical disk drive, a magneto-optical disk drive, a compact disk drive, compact disk array, and/or any computer-readable medium operable to store data. Data storage 210 may include a database or a collection of files.

Cluster engine 225 may be configured to cluster the data chunks into a number of groups based on their overwrite frequency. For example, data chunks may be grouped based on the number of times that they are overwritten, such that data chunks that have been overwritten the same number of times may belong in the same cluster or group. Cluster engine 225 may also cluster the data chunks into different groups based on their read frequency. For example, data chunks may be grouped based on the number of times that they have been read, such that data chunks that have been read the same number of times may belong in the same group. Cluster engine 225 may use a clustering algorithm such as a mean shift clustering algorithm to cluster the data. Prior to the clustering operation, cluster engine 225 may reduce the dimensionality of the matrix.

Figure 11:
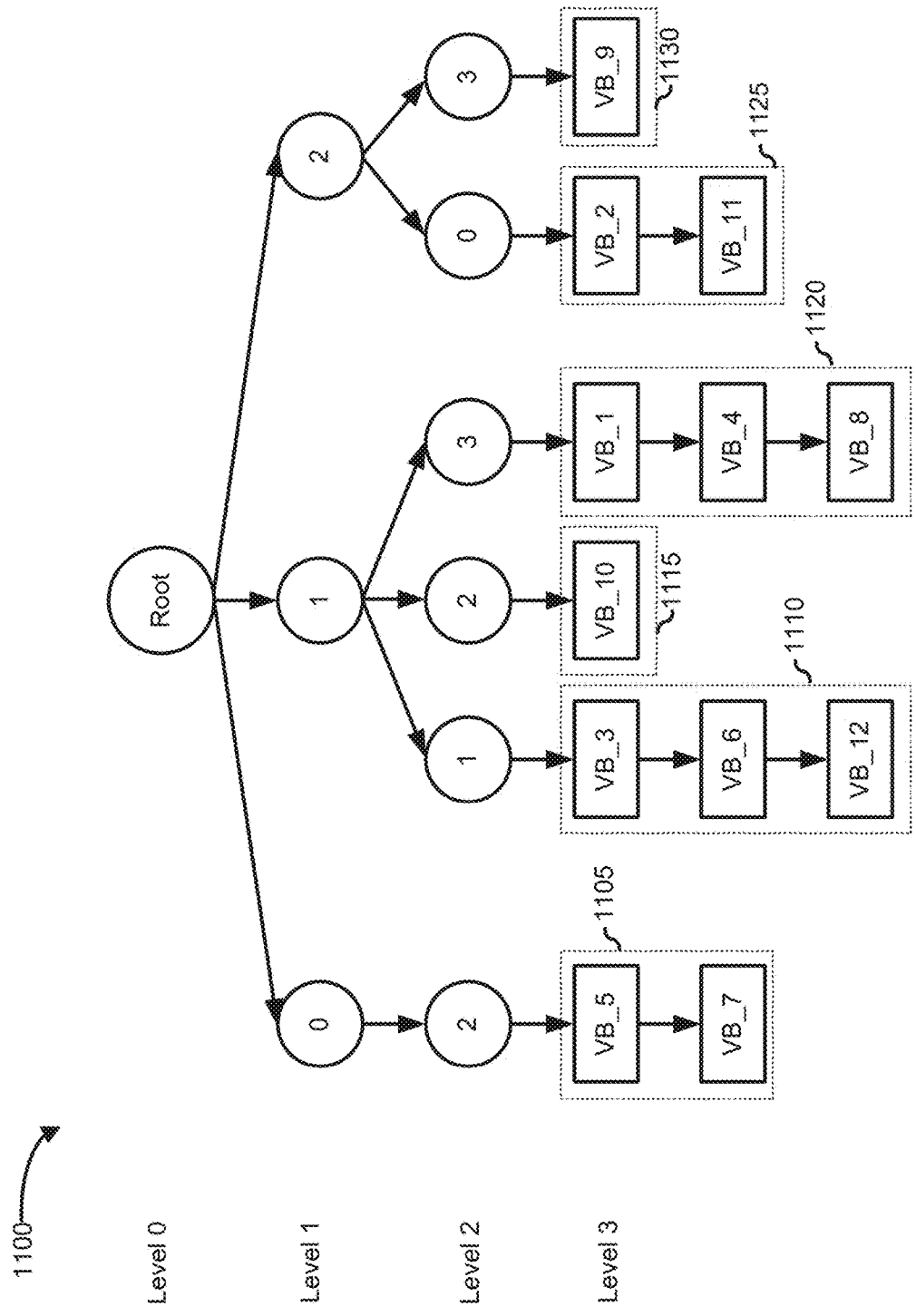
FIG. 11 shows a diagram of a sorted tree based on overwrite frequency label, read frequency label, and virtual logical block address, according to an embodiment of the present disclosure.

Sorting engine 230 may be configured to sort the data by creating a multi-level N-ary sorted tree, such as a sorted tree 1100 of FIG. 11. Sorting engine 230 may be configured to use a sorted tree to combine the outputs of the clustering algorithm with the virtual logical block address to group the data chunks. Accordingly, during a data flush, data flush module 235 may traverse the sorted tree via a breadth-first search and write the data chunks to the physical data blocks in data storage 210 according to the order in which they were visited during the breadth-first search.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description. In one embodiment, system 200 may be part of an information handling system. In another embodiment, one or more components of system 200 may be distributed among different information handling systems. For example, one information handling system may host data storage 210, and another to host data processing system 220.

Figure 3:
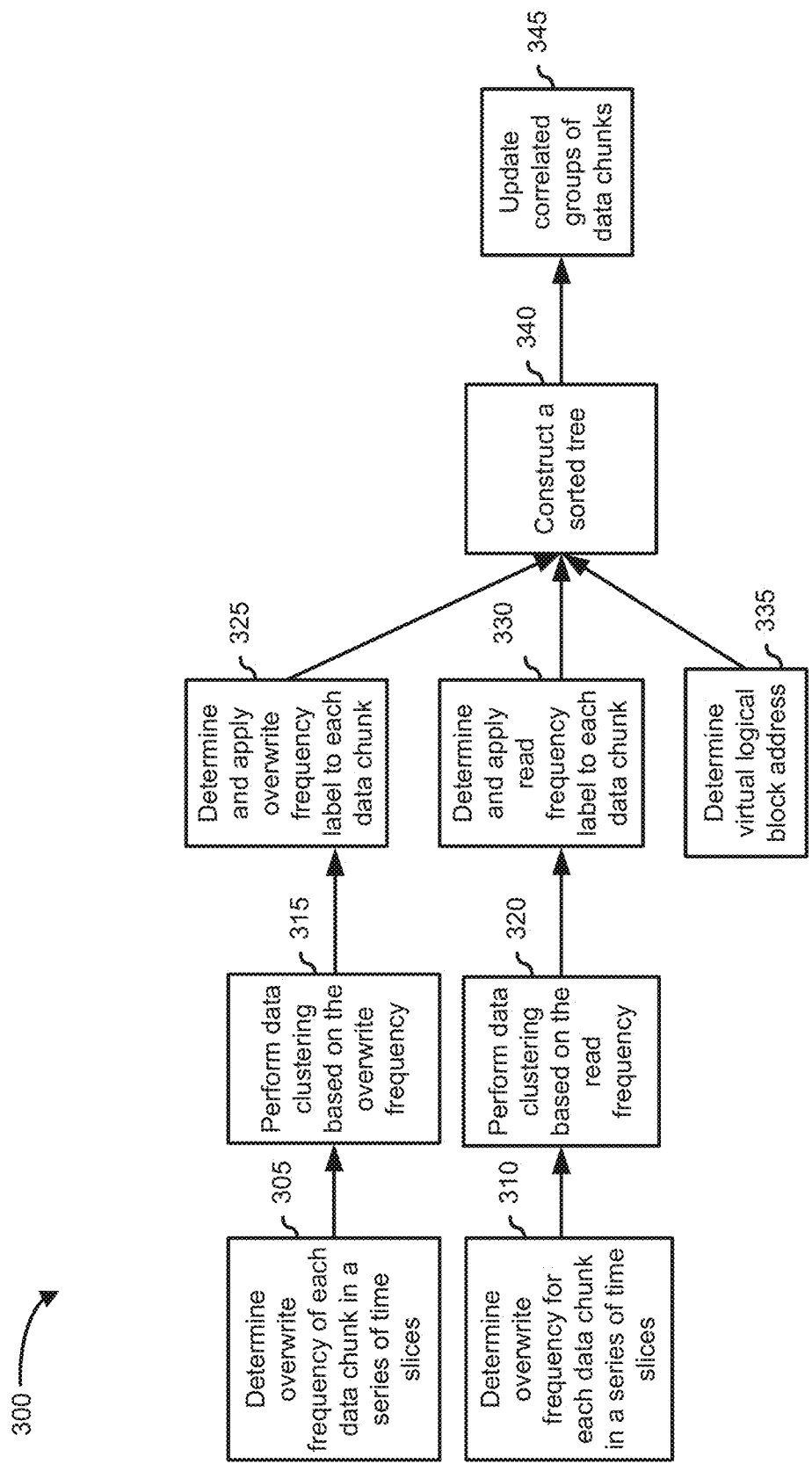
FIG. 3 is a flowchart illustrating a method for a correlation-based update mechanism, according to an embodiment of the present disclosure.

FIG. 3 shows a flowchart of method 300 for a correlation-based update mechanism. Method 300 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 300 typically starts at blocks 305 and 310 which may be processed in parallel. At block 305, the method tracks the overwrite frequency of each data block for a time slice. A time slice is an arbitrary duration, such as one minute, five minutes, one hour, etc. Two data chunks that have a similar write frequency may have a higher probability to be written together in a physical data block. Some of the data chunks may have no record of being updated or overwritten. However, these data chunks may have been read. Subsequent to determining the number of times that each of the data chunks has been overwritten for the time slice, an overwrite frequency matrix similar to an overwrite frequency matrix 600 of FIG. 6 may be generated.

At block 310, the method tracks the read frequency of each data block. If two data chunks have similar read frequency values, these data chunks may have a higher probability of being related and may be written in the same physical data block. Subsequent to determining the number of times the data chunks have been read, a read frequency matrix similar to a read frequency matrix 700 of FIG. 6 may be generated.

At block 315, data clustering is performed on the data based on the overwrite frequency of each data chunk. For example, data clustering may be performed based on an overwrite frequency matrix, such as the overwrite frequency matrix 600 of FIG. 6. At block 325, the clustering may determine the overwrite frequency labels and apply these to each data chunk in the clustered data, as shown in table 1000 of FIG. 10. For example, if there are three clusters of data chunks, then the overwrite frequency label may be based on the cluster that the data chunk belongs to. Thus, a data chunk in a first cluster may have an overwrite frequency label of one, while a data chunk in a second cluster may have an overwrite frequency label of two.

At block 320, data clustering is performed on the data based on the read frequency of each data chunk for each of the time slices. For example, data clustering may be performed based on a read frequency matrix, such as the read frequency matrix 700 of FIG. 7. At block 330, the clustering may determine the read frequency labels and apply these to each data chunk in the clustered data, as shown in table 1000 of FIG. 10. For example, if there are three clusters of data chunks, then the read frequency label may be based on the cluster that the data chunk belongs to. Thus, a data chunk in a first cluster may have a read frequency label of one, while a data chunk in a second cluster may have a read frequency label of two.

At block 335, the virtual logical block addresses of the data chunks may be used as an input feature, similar to the overwrite frequency label and the read frequency label. Adjacent virtual logical block addresses may belong to the same volume or adjacent volumes of a physical data block. For example, data chunks for the same software applications may be stored in the same physical data block.

At block 340, the data chunks are sorted and/or grouped by constructing or reconstructing a sorted tree based on the overwrite frequency label and read frequency label. At block 345, the method may populate or update the sorted tree with the virtual logical block addresses of the data chunks by traversing the tree via breadth-first search. The data chunks may be correlated if they have the same overwrite frequency and read frequency labels. The data chunks may also be correlated if they have the same overwrite frequency label. For example, a leaf node may include one or more sorted virtual logical block addresses of data chunks that have the same overwrite frequency label and read frequency label. While the virtual logical block addresses of data chunks with the same overwrite frequency label may be in neighboring leaf nodes.

Figure 4:
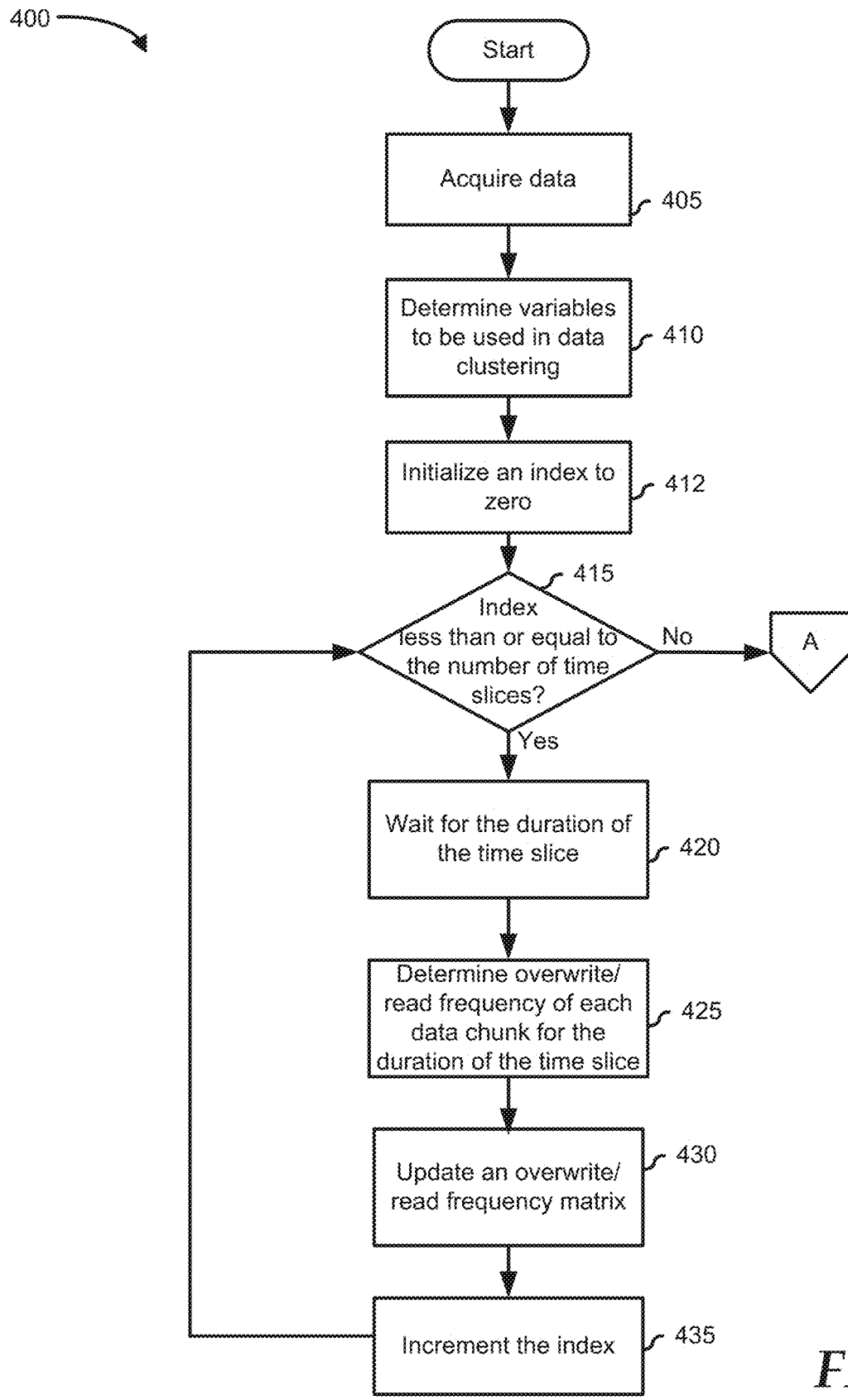
FIGS. 4 and 5 are flowcharts illustrating a method for a correlation-based update mechanism, according to an embodiment of the present disclosure.

FIG. 4 shows method 400 for data clustering based on overwrite and/or read frequency. Method 400 may be performed by one or more components of system 200 of FIG. 2. For example, method 400 may be performed by cluster engine 225. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 400 typically starts at block 405 where the system can acquire data that includes one or more data chunks, also referred to as data blocks, such as by accessing a data store or receiving the data from various sources. The data acquired may be of a series with one or more time slices. Thus, the data may be chunked by time slices. For example, a data chunk may be a time slice. At 410, the system can determine one or more variables also referred to as descriptors to be used in the clustering of the data chunks.

At 410, the method determines variables, also referred to as descriptors, such as overwrite frequency and read frequency, to be used in data clustering. Other information may also be used for clustering such as a unique identifier for each of the data chunks which may include a virtual logical address. Input for the clustering may include an overwrite frequency matrix or a read frequency matrix.

At block 412, the index value is set to zero. The index may be used to identify the time slice of the data chunk that is currently being processed. At decision block 415, the method determines whether an index is less than the number of time slices. The index indicates the current time slice being processed. If the index is less than or equal to the number of the time slices, then the method takes the "YES" branch and proceeds to block 420. If the index is not less than or equal to the number of time slices, then the method takes the "NO" branch and proceeds to block 505 of FIG. 5. In other words, the method performs blocks 420, 425, 430, and 435 while the index is less than the number of time slices.

At block 420, the method may wait for the duration of the time slice. For example, if the time slice is one minute, then the method may wait until the minute is finished. While waiting, the method may track the number that the data chunk that was overwritten and/or read for the duration of the time slice. At block 425, the method may collect valid data chunks and associated overwrite frequency/or read frequency. The valid data chunk may be data for the entire duration of the time slice. Invalid data may be data with a duration that is less than the time slice. At block 435, the method increments the value of the index by one.

Figure 5:
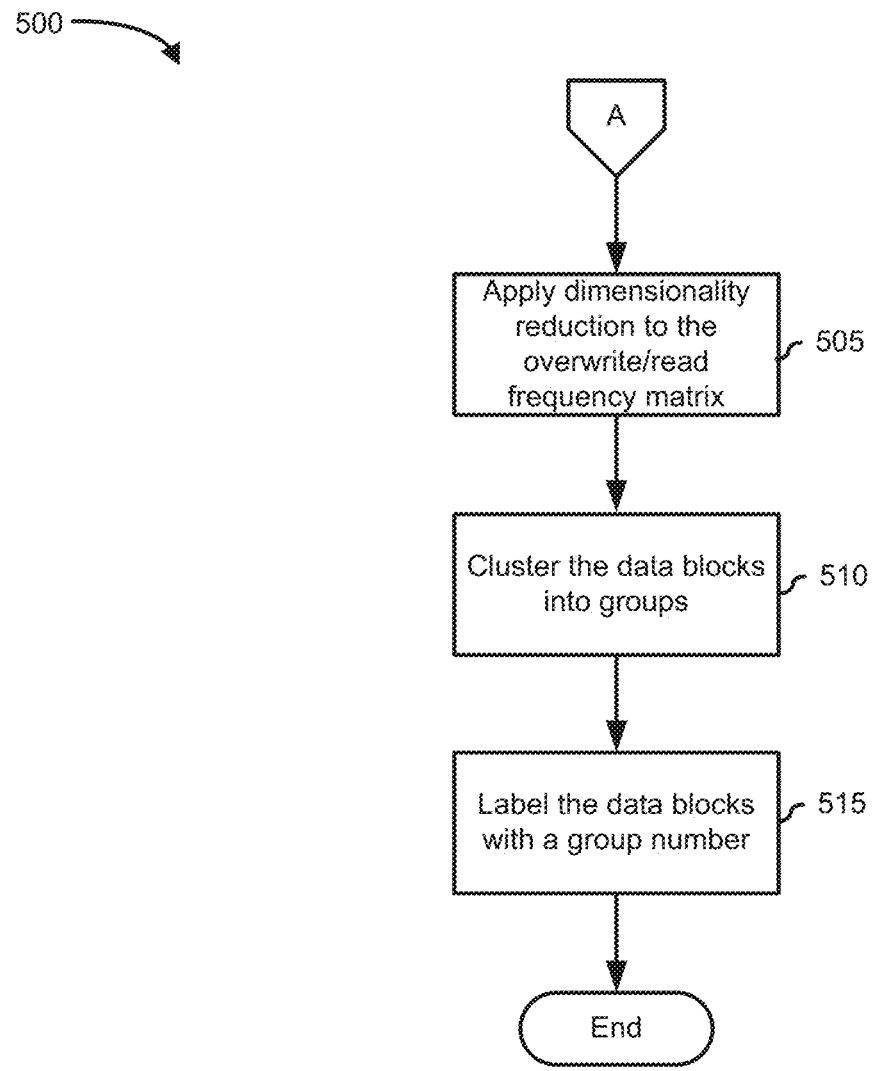

FIG. 5 shows a method 500 for data clustering. Method 500 is a continuation of method 400 of FIG. 4. Method 500 typically starts at block 505, where the method may apply a dimensionality reduction to the overwrite frequency matrix and/or read frequency matrix, such as from F (m, n) to F (m, 2). In this example, F refers to the overwrite frequency matrix and/or the read frequency matrix with dimensions m by n, wherein m refers to the number of data chunks and n refers to the number of time slices.

At block 510, the method clusters the data chunks into groups based on the overwrite frequency. The method may also cluster the data chunks into groups based on the read frequency. At block 515, the method may label each data block with a number of the cluster that the data chunk is part of. For example, if the data block is part of the first cluster based on the overwrite frequency then the data block may have an overwrite frequency label of one. In addition, the data block may be associated with a read frequency label based on the cluster it belongs to. For example, the data block is part of the first cluster based on the overwrite frequency, and then the data block may also be associated with a read frequency label of one. As such, the data block may have two labels, one for the overwrite frequency label and two for the ready frequency label as depicted in table 1000 of FIG. 10.

FIG. 6 shows an example of an overwrite frequency matrix 600 for a sample of sixty virtual logical block addresses of data chunks with one hundred time slices. A virtual logical block address includes a pointer to a location of a data chunk in a physical data block at a data storage device such as an HDD, SSD, ODD, or similar. A time slice may be a particular duration, such as a minute, five minutes one hour, etc. The time slices for a given matrix are usually equal, such that if a one-time slice has a duration of one minute, the rest of the time slices in the matrix have a duration of one minute each. The values in the matrix show the overwrite frequency for the data chunks for each time slice. A virtual logical block address, also referred to as a virtual block (VB) may be used as a logical block address for a data chunk. For example, VB_1 has been overwritten once within the duration of time slice zero (TS_0).

FIG. 7 shows an example of a read frequency pattern matrix for a sample of sixty virtual logical block addresses of data chunks in one hundred time slices. The values in the read frequency matrix show the read frequency of the data chunks for each time slice. For example, VB_1 has been read seven times within the duration of TS_0.

Figure 8:
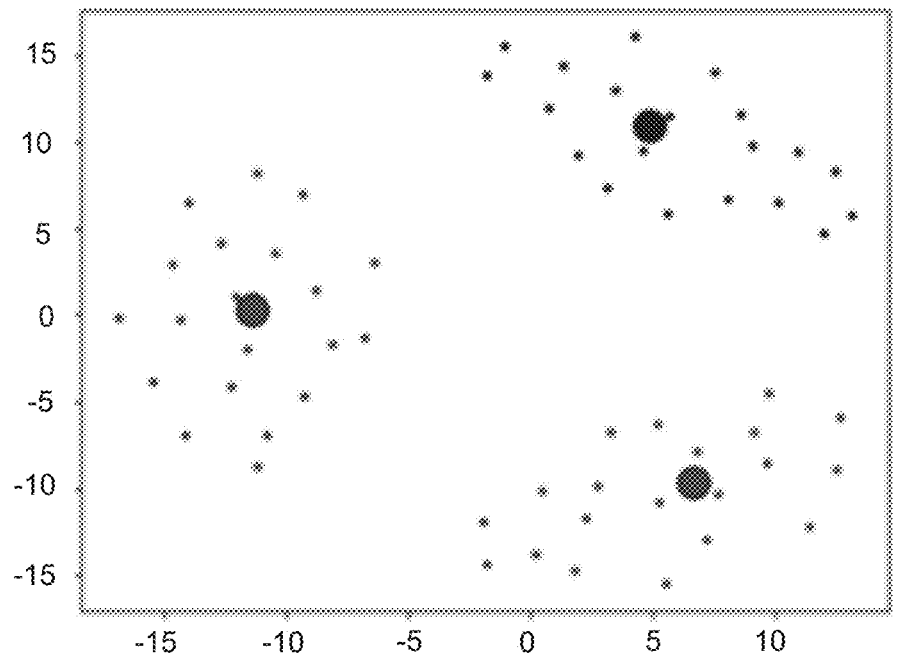
FIG. 8 is a diagram of clustered data based on an overwrite frequency matrix, according to an embodiment of the present disclosure.

FIG. 8 shows clustered data 800 of data chunks based on the overwrite frequency matrix. The data chunks were clustered by a clustering algorithm, such as mean shift clustering, k-means clustering, density-based clustering, etc., into clusters or groups. In this example, the mean shift clustering algorithm may have been used to cluster the data chunks into three groups.

Figure 9:
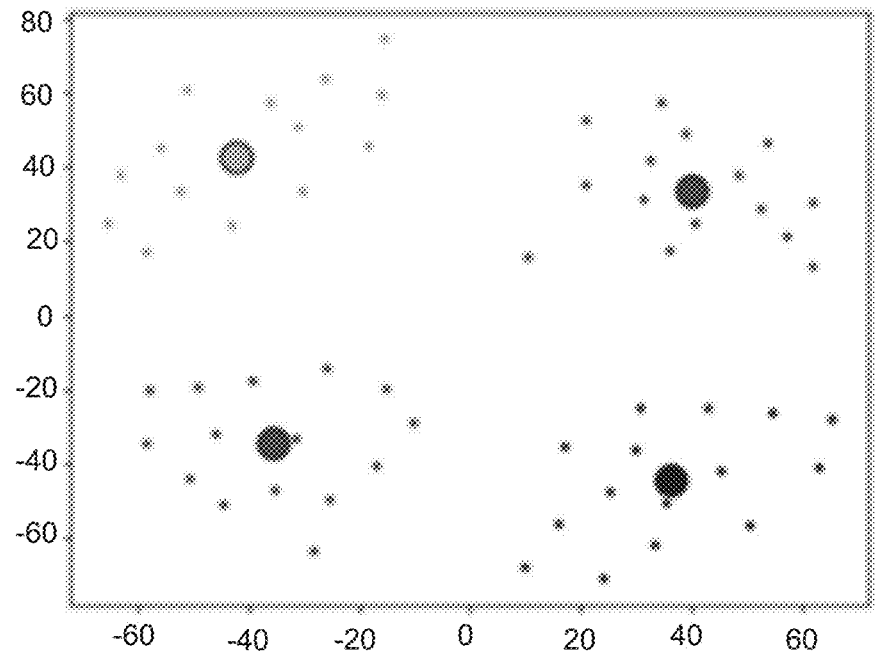
FIG. 9 is a diagram of clustered data based on a read frequency matrix, according to an embodiment of the present disclosure.

FIG. 9 shows clustered data 900 of data chunks based on the read frequency matrix. Similar to the above, the data chunks may have been clustered by a clustering algorithm, such as the mean shift clustering, into clusters or groups. In this example, the mean shift clustering algorithm may have been used to cluster the data chunks into four groups. Prior to performing the clustering algorithm, the dimensionality of the matrices is reduced. For example, the dimensionality of overwrite frequency pattern matrix and/or read frequency pattern matrix is reduced from F (m, n) F (m, 2) which denotes an m*n matrix. Although various embodiments are described with respect to the use of mean-shift clustering, it should be appreciated that various other clustering algorithms may be used. In some embodiments, mean-shift clustering may be used as the clustering algorithm since there is no pre-known number of clusters.

Figure 10:
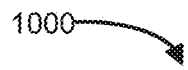
FIG. 10 is a table of sample data with associated overwrite frequency and read frequency labels based on clustering operations, according to an embodiment of the present disclosure.

FIG. 10 shows table 1000 which includes limited sample data used to illustrate a mechanism of the present disclosure. In this example, table 1000 shows which overwrite frequency cluster and read frequency cluster, such as overwrite label and read label respectively, for each data chunk. Each row associated with a virtual logical block address of a data chunk that belongs to the same overwrite frequency cluster and read frequency cluster are shaded the same. For example, VB_5 and VB_7 are shaded the same.

FIG. 11 shows a multi-level sorted tree 1100 which is used to group the data chunks. In particular, sorted tree 1100 may be used to combine the clustering outputs based on which cluster the data chunk belongs into. Sorted tree 1100 has multiple levels that start with the root as level zero. Level zero includes a root node while level one and level two include parent nodes and level three includes leaf nodes. The index of each parent node in level one may be based on the value of overwrite frequency label while the index of each parent node in level two may be based on the value of the read frequency label.

The sorted tree may be populated by traversing the parent nodes. For example, a data chunk with an overwrite frequency label of one and a read frequency label of two will traverse the sorted tree to the parent node with an index value of one at level one and then to a parent node with an index value of two at level two. A leaf node may be created or updated with an additional virtual logical block address of the data chunk. A second data chunk with the same values for the overwrite frequency label and read frequency label may be added to the same leaf based on their virtual logical block addresses. For example, the virtual logical block addresses may be sorted. For example, virtual blocks VB_5 and VB_7 are in the same group 1105 as both of these virtual blocks have overwrite frequency label of zero and read frequency label of two. Data chunks with the same values for the overwrite frequency labels may be grouped in neighboring leaf nodes. For example, groups 1110, 1115, and 1120 are included in neighbor leaf nodes. As such, the leaf nodes include groups of sorted virtual logical block addresses of the data chunks. In this example, sorted tree 110 includes six groups, such as groups 1105, 1110, 1115, 1120, and 1125. During a data flush process, the sorted tree may be easily traversed via breadth-first search and write data to the physical data chunks according to a bread-first search order.

Figure 12:
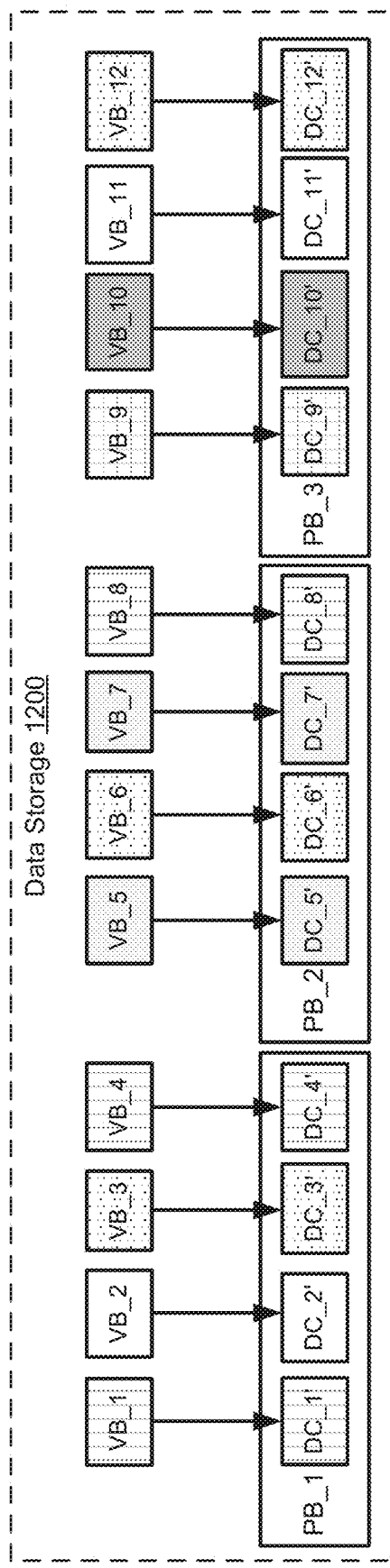
FIG. 12 shows a diagram of data chunks at a physical data block, according to an embodiment of the present disclosure.

FIG. 12 shows a portion of data storage 1200 which may be a copy-on-write storage system. In particular, the portion of data storage 1200 shows the association of a virtual logical block address and a physical data block. In this example, a virtual logical block address is associated with an address of a physical data block where a data chunk is stored. For example, VB_1 is a virtual logical block address of data chunk DC_1 which is stored at a physical data block PB_1 of data storage 1200. Similarly, VB_2 is the virtual logical block address of data chunk DC_2 stored at PB_2 of data storage 1200, and so on. The virtual blocks and corresponding data chunks are shaded based on their group association in sorted tree 1100 of FIG. 11. For example, because VB_1, VB_4, and VB_8 are in the same group, they are shaded the same. Similarly, VB_3, VB_6, and VB_12 are also shaded the same, and so on. In this example, the data chunk may be flushed to data storage 1200 according to the virtual logical block address.

Figure 13:
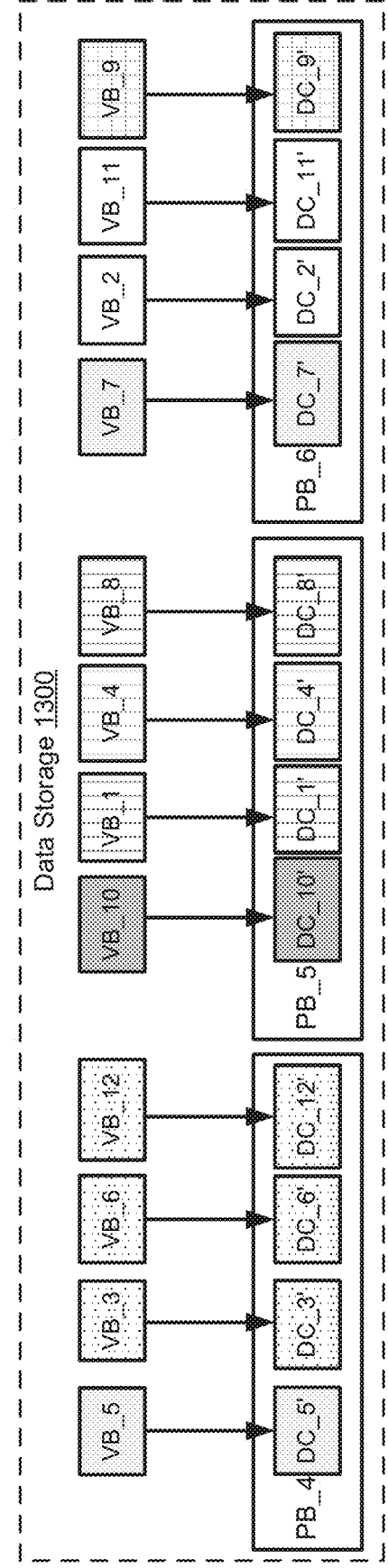
FIG. 13 shows a diagram of clustered data chunks at a physical data block, according to an embodiment of the present disclosure.

FIG. 13 shows a portion of a data storage 1300 which is similar to data storage 1200. In this example, the data chunk may be flushed to data storage 1300 based on sorted tree 1100 of FIG. 11, such as in the order of a breadth-first search. Thus, the data chunks may be flushed based on the overwrite frequency label, read frequency label, and virtual logical block address. Accordingly, data chunks that belong to the same group may be stored in the same physical data block.

Figure 14:
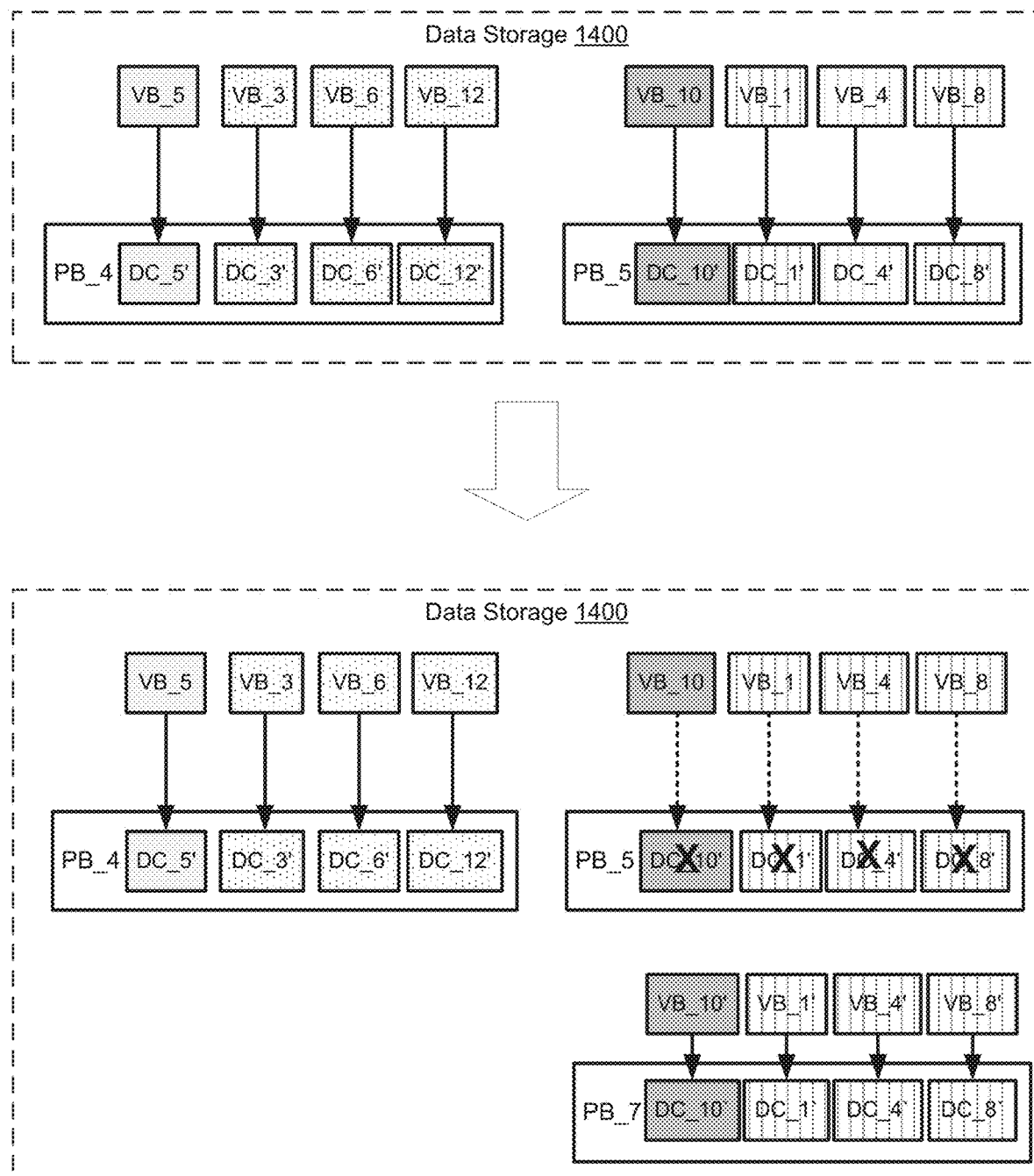
FIG. 14 shows a diagram of updating clustered data chunks at a physical data block, according to an embodiment of the present disclosure.

FIG. 14 shows a portion of data storage 1400 which is similar to data storage 1300 of FIG. 13. In this example, data chunks DC_5', DC_3', DC_6', and DC_12' are stored in physical data block PB 4. In addition, data chunks DC_10', DC_1', DC_4', and DC_8' are stored in physical data block PB_5. When an update occurs on data chunks like DC_10', DC_1', DC_4', and DC_8', a copy of DC_10', DC_1', DC_4', and DC_8' in a different physical data block such as PB_7 may be created and modifications are made of the copy.

The method may also create new virtual logical block addresses, such as VB_10', VB_1', VB_4', and VB_8' may be created with pointers to DC_10', DC_1', DC_4', and DC_8'. Data chunks DC_10', DC_1', DC_4', and DC_8' in PB_5 may then be deleted. However, because the aforementioned data chunks are stored in the same physical data block, consecutive memory spaces within the physical data block are deleted instead of various small portions, fragmentation within the physical data block is avoided. For example, if the data chunks DC_10', DC_1', DC_4', and DC_8' are not stored in the same physical data block but stored in different physical data blocks, then the physical data blocks may be fragmented. However, if the data chunks DC_10', DC_1', DC_4', and DC_8' are stored in the same physical data block, such as in this example, then the physical data blocks may not be fragmented when the data chunks are deleted.

Although FIG. 3, FIG. 4, and FIG. 5 show example blocks of method 300, method 400, and method 500 in some implementations, method 300, method 400, method 500 may include additional blocks, fewer blocks, different blocks, or differently arranged blocks than those depicted in FIG. 3, FIG. 4, and FIG. 5. Those skilled in the art will understand that the principles presented herein may be implemented in any suitably arranged processing system. Additionally, or alternatively, two or more of the blocks of method 300, method 400, and method 500 may be performed in parallel. For example, block 325 of method 300, block 330, and block 335 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
acquiring, by a processor, a plurality of data chunks with a duration of at least one time slice;
determining an overwrite frequency for the duration of the time slice of each of the data chunks, clustering the data chunks based on the overwrite frequency, and determining an overwrite frequency label for each cluster of the data chunks;
determining a read frequency for the duration of the time slice of each of the data chunks, clustering the data chunks based on the read frequency, and determining a read frequency label for each cluster of the data chunks; and
constructing a sorted tree based on the overwrite frequency label, the read frequency label, and a virtual logical block address of each of the data chunks, wherein a first index of a first parent node in a first level of the sorted tree is based on the overwrite frequency label, and wherein a second index of a second parent node in a second level of the sorted tree is based on the read frequency label.

2. The method of claim 1, wherein the data chunks with same values for the overwrite frequency label and the read frequency label are included in one leaf node.

3. The method of claim 1, wherein the data chunks with same values for the overwrite frequency label are included in neighbor leaf nodes.

4. The method of claim 1, wherein the sorted tree is used to group the data chunks based on the overwrite frequency label and the read frequency label.

5. The method of claim 1, wherein the overwrite frequency is a number of times that a data chunk has been overwritten for the duration of the time slice.

6. The method of claim 1, wherein the read frequency is a number of times that a data chunk has been read for the duration of the time slice.

7. The method of claim 1, wherein a leaf node of the sorted tree includes one or more data chunks that are sorted according to the virtual logical block address.

8. An information handling system, comprising:
a processor; and
a memory storing instructions that when executed cause the processor to perform operations including:
acquiring a plurality of data chunks for a duration of at least one time slice;
determining an overwrite frequency for the duration of the time slice of each of the data chunks, clustering the data chunks according to the overwrite frequency, and determining an overwrite frequency label for each cluster of the data chunks;
determining a read frequency for the duration of the time slice of each of the data chunks, clustering the data chunks based on the read frequency, and determining a read frequency label for each of the cluster of the data chunks; and
constructing a sorted tree based on the overwrite frequency label, the read frequency label, and a virtual logical block address of each of the data chunks, wherein a first index of a first parent node in a first level of the sorted tree is based on the overwrite frequency label, and wherein a second index of a second parent node in a second level of the sorted tree is based on the read frequency label.

9. The information handling system of claim 8, wherein the data chunks with same values for the overwrite frequency label and the read frequency label are included in one leaf node.

10. The information handling system of claim 8, wherein the data chunks with same values for the overwrite frequency label are included in neighbor leaf nodes.

11. The information handling system of claim 8, wherein the sorted tree is used to group the data chunks based on the overwrite frequency label and the read frequency label.

12. The information handling system of claim 8, wherein the overwrite frequency is a number of times that a data chunk has been overwritten for the duration of the time slice.

13. The information handling system of claim 8, wherein the read frequency is a number of times that a data chunk has been read for the duration of the time slice.

14. The information handling system of claim 8, wherein a leaf node of the sorted tree includes one or more data chunks that are sorted according to the virtual logical block address.

15. A non-transitory computer-readable medium to store instructions that are executable to perform operations comprising:
   acquiring a plurality of data chunks for a duration of at least one time slice;
   determining an overwrite frequency for the duration of the time slice of each of the data chunks, clustering the data chunks according to the overwrite frequency, and determining an overwrite frequency label for each cluster of the data chunks;
   determining a read frequency for the duration of the time slice of each of the data chunks, clustering the data chunks based on the read frequency, and determining a read frequency label for each of the cluster of the data chunks; and
   constructing a sorted tree based on the overwrite frequency label, the read frequency label, and a virtual logical block address of each of the data chunks, wherein a first index of a first parent node in a first level of the sorted tree is based on the overwrite frequency label, and wherein a second index of a second parent node in a second level of the sorted tree is based on the read frequency label.

16. The non-transitory computer-readable medium of claim 15, wherein the virtual logical block address of each of the data chunks with same values for the overwrite frequency label and the read frequency label are included in one leaf node.

17. The non-transitory computer-readable medium of claim 15, wherein the virtual logical block address of each of the data chunks with same values for the overwrite frequency label are included in neighbor leaf nodes.

18. The non-transitory computer-readable medium of claim 15, wherein the sorted tree is used to group the data chunks based on the overwrite frequency label and the read frequency label.

19. The non-transitory computer-readable medium of claim 15, wherein the overwrite frequency is a number of times that a data chunk has been overwritten for the duration of the time slice.

20. The non-transitory computer-readable medium of claim 15, wherein the read frequency is a number of times that a data chunk has been read for the duration of the time slice.

* * * * *